United States Patent Office 3,117,124
Patented Jan. 7, 1964

3,117,124
BENZOTHIAZOLE, BENZOTHIAZINE, AND
BENZOTHIAZEPINE COMPOUNDS
John Krapcho and Harry Louis Yale, New Brunswick,
N.J., assignors to Olin Mathieson Chemical Corporation, New York, N.Y., a corporation of Virginia
No Drawing. Filed Mar. 20, 1957, Ser. No. 647,185
12 Claims. (Cl. 260—243)

This invention relates to new chemical compounds having valuable therapeutic properties and processes for the preparation thereof.

The therapeutically active compounds of this invention are bases of the general Formula I:

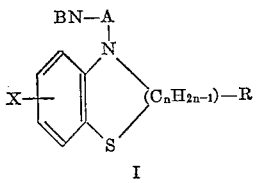

I and the acid-addition salts thereof, wherein $n$ is a positive integer less than four; X is hydrogen, lower alkyl, lower alkoxy, halo or trifluoromethyl; R is hydrogen, lower alkyl, or an X-substituted phenyl, wherein X is as above-defined; A is lower alkylene (particularly propylene); and BN is a basic nitrogen-containing radical of less than twelve carbon atoms. Among the suitable radicals represented by the symbol BN are: amino; (lower alkyl)amino; di(lower alkyl)amino; (hydroxy-lower alkyl)amino; di(hydroxy-lower alkyl)amino; and saturated 5 to 6 membered monocyclic heterocyclic radicals of less than twelve carbon atoms, as exemplified by piperidino; (lower alkyl)piperidino; di(lower alkyl)piperidino; (lower alkoxy)piperidino; pyrrolidino; (lower alkyl)pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino (e.g., N⁴-methylpiperazino); di(lower alkyl)piperazino; and (lower alkoxy)piperazino. The terms "lower alkyl," "lower alkoxy," and "lower alkylene," as employed herein, include both straight and branched chain radicals of less than eight carbon atoms. The particularly preferred compounds are those wherein X is hydrogen or chloro, R is hydrogen, A is propylene and BN is di(lower alkyl).

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids such as oxalic, tartaric, citric, acetic and succinic acid, theophylline and 8-chlorotheophylline.

The N-(aminoalkyl)-compounds of this invention and the acid-addition salts thereof are therapeutically active compounds which are utilizable as central nervous system depressants, ataractic agents and as antispasmodics, especially in the treatment of Parkinsonism. Thus, the compounds of this invention can be administered perorally in the same manner as benztropine methanesulfonate in the treatment of Parkinsonism, the dosage for such treatment being adjusted for the activity of the particular compound employed.

The compounds of this invention can be prepared by condensing a compound of the Formula II:

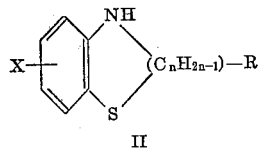

II wherein $n$, X and R are as hereinbefore defined, with an aminoalkyl halide of the formula BN—A—Y, wherein BN and A are as hereinbefore defined and Y is halide, particularly chloride. This reaction is preferably conducted by heating the reactants in the presence of a basic condensing agent, such as an alkali metal, an alkali metal amide (e.g., sodamide), or an alkali metal hydroxide. To form the acid-addition salts, the free base initially formed is interacted with at least one equivalent of the desired acid.

To prepare the starting materials (the compounds of Formula II) wherein X is other than hydrogen, a 2-aminothiophenol of the formula

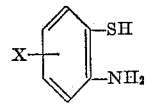

is interacted with an alkylenedihalide of the formula

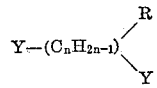

wherein $n$ is a positive integer less than four and Y is halide (particularly bromide).

The following examples illustrate the invention (all temperatures being in centigrade):

EXAMPLE 1

5-(3-Dimethylaminopropyl)-2,3,4,5-Tetrahydro-1,5-Benzothiazepine Hydrochloride (a) *2,3,4,5-tetrahydro-1,5-benzothiazepine.*—2,3,4,5-tetrahydro-1,5-benzothiazepine hydrobromide is prepared by the method of Mushkalo and Fedorova, Ukrain. Khim. Zhur., 20, 305–7 (1954), and is converted to the free base by solution in water, treatment with potassium carbonate and extraction with ether. The ether extracts are dried and the product recovered by distillation to give the desired free base boiling at about 117–120°/0.9 mm. The base has the formula

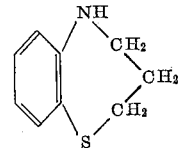

(b) *5-(3-dimethylaminopropyl)-2,3,4,5-tetrahydro-1,5-benzothiazepine.*—A solution of 2,3,4,5-tetrahydro-1,5-benzothiazepine (36.8 g., 0.223 mole) in 200 ml. of toluene is added dropwise with stirring to a mixture of 10.2 g. (0.26 mole) of sodium amide and 300 ml. of toluene. The solution is refluxed for five hours. To this solution is added dropwise with stirring 285 ml. of a 0.833 M solution of dimethylaminopropyl chloride in toluene. After the addition is completed (20 min.), the solution is refluxed for six hours.

The solution is filtered, partially decolorized with Darco charcoal, filtered with the aid of Hyflo, and distilled to remove the toluene. The product is purified by distillation to yield about 21.6 g. distilling at 101.5°/0.08 mm. to 121.5°/0.13 mm. The product is redistilled to yield a product distilling at about 117–122° at 0.14 mm.

(c) *5 - (3 - dimethylaminopropyl)-2,3,4,5-tetrahydro-1,5-benzothiazepine, hydrochloride.*—To a solution of 5-

(3 - dimethylaminopropyl)-2,3,4,5-tetrahydro-1,5-benzothiazepine (11.8 g., 0.0472 mole) in 75 ml. of anhydrous ether is added 9.1 ml. of 5.17 N ethanolic hydrogen chloride. The solid which results is filtered and dried to yield about 12.8 g. of product melting at about 135–137°, after recrystallization from acetone.

EXAMPLE 2

5-(2-Dimethylaminopropyl)-2,3,4,5-Tetrahydro-1,5-Benzothiazepine, Hydrochloride (a) *5 - (2 - dimethylaminopropyl)-2,3,4,5-tetrahydro-1,5-benzothiazepine.*—A solution of tetrahydrobenzothiazepine (41.6 g., 0.252 mole) in 200 ml. of toluene is added dropwise with stirring to a suspension of sodium amide (11.5 g., 2.95 mole) in 200 ml. of toluene. After the addition is complete (30 min.) the solution is refluxed for eleven hours. Then 270 ml. of a 0.952 N solution of β-dimethylaminoisopropyl chloride is added dropwise with stirring. After the addition is complete, the solution is refluxed for eighteen hours and allowed to cool to room temperature. The solution is filtered, partially decolorized with Darco charcoal and filtered again with Hyflo. The toluene is removed from the filtrate by distillation. The product is purified by distillation under reduced pressure to yield about 11.7 g. of a liquid distilling at about 108–114°/0.06 mm.

(b) *5 - (2 - dimethylaminopropyl)-2,3,4,5-tetrahydro-1,5-benzothiazepine hydrochloride.*—To a solution of 5-(2 - dimethylaminopropyl)-2,3,4,5-tetrahydro-1,5-benzothiazepine (11.7 g., 0.0468 mole) in 100 ml. of ether is added 9.4 ml. of a 5.01 N solution of ethanolic hydrogen chloride. A white solid precipitates immediately. The precipitate is filtered and dried to yield about 10.2 g. of product melting at about 178–179° after recrystallization from acetone.

EXAMPLE 3

5-(2-Piperidinoethyl)-2,3,4,5-Tetrahydro-1,5-Benzothiazepine Oxalate (a) *5-(2-piperidinoethyl)-2,3,4,5-tetrahydro-1,5-benzothiazepine.*—A solution of tetrahydrobenzothiazepine (33 g., 0.2 mole) in 200 ml. of toluene is added dropwise with stirring to a suspension of sodium amide (10 g., 0.25 mole) in 300 ml. of toluene. After the addition is complete (30 minutes), the solution is refluxed for ten hours. Then 290 ml. of a 0.8 N solution of β-piperidinoethyl chloride in toluene is added dropwise with stirring. After the addition is complete, the solution is refluxed for twenty hours and allowed to cool to room temperature. The solution is filtered, partially decolorized with Darco charcoal and filtered again with Hyflo. The toluene is removed from the filtrate by distillation. The product is purified by distillation under reduced pressure to yield about 26 g. of base.

(b) *5-(2-piperidinoethyl)-2,3,4,5-tetrahydro-1,5-benzothiazepine oxalate.*—To a solution of 5-(2-piperidinoethyl)-2,3,4,5-tetrahydro-1,5-benzothiazepine (13.8 g., 0.05 mole) in 100 ml. of ether is added a solution of 4.6 g. of anhydrous oxalic acid in 30 ml. of anhydrous acetonitrile. The salt is precipitated completely by the addition of anhydrous ether, filtered and dried to yield about 17 g. of product.

Similarly, if other aminoalkyl halides (e.g., 3-pyrrolidinopropyl chloride and 2-morpholinopropyl chloride) are substituted for the aminoalkyl halides in the procedures of section *b* of Example 1 or section *a* of Examples 2 or 3, the corresponding 5-substituted-2,3,4,5-tetrahydro-1,5-benzothiazepines [e.g., 5-(3-pyrrolidinopropyl)-2,3,4,5-tetrahydro-1,5-benzothiazepine and 5-(2-morpholinopropyl)-2,3,4,5-tetrahydro-1,5-benzothiazepine] are obtained.

EXAMPLE 4

5-(3-Diethylaminopropyl)-7-Chloro-2,3,4,5-Tetrahydro-1,5-Benzothiazepine Hydrobromide (a) *7-chloro-2,3,4,5-tetrahydro-1,5-benzothiazepine.*—A mixture of trimethylene dibromide (293 g., 1.45 mole), glacial acetic acid (350 ml.) and the zinc salt of 4-chloro-2-aminothiophenol (199 g., 0.525 mole) is refluxed with stirring for one hour and allowed to cool to room temperature overnight.

The mixture is filtered and the precipitate dried to yield about 128 g. of a product melting at about 195–198° C. A 1 g. sample is recrystallized from absolute alcohol to yield about 0.43 g., M.P. about 198–202°. Infrared and spectrophotometric analysis indicates this product is the zinc bromide salt of 7-chloro-2,3,4,5-tetrahydro-1,5-benzothiazepine. This salt is added to distilled water and neutralized with sodium bicarbonate. The solution is made strongly alkaline by the addition of sodium hydroxide and extracted with three 300-ml. portions of ether. The ether extracts are combined and dried over anhydrous magnesium sulfate overnight. The ether is removed by distillation to leave a residue of about 56.5 g., which is distilled under reduced pressure to yield about 47.5 g., B.P. about 129–131°/0.3 mm.

(b) *5-(3-diethylaminopropyl)-7-chloro-2,3,4,5-tetrahydro-1,5-benzothiazepine.*—A solution of 7-chloro-2,3,4,5-tetrahydro-1,5-benzothiazepine (60 g., 0.3 mole) in 300 ml. of toluene is added dropwise with stirring to a mixture of 14 g. (0.35 mole) of sodium amide and 500 ml. of toluene. The solution is refluxed for five hours. To this solution is added dropwise with stirring 350 ml. of a 0.9 M solution of diethylaminopropyl chloride in toluene. After the addition is complete (20 minutes), the solution is refluxed for six hours. The solution is filtered, partially decolorized with Darco charcoal, filtered with the aid of Hyflo and distilled to remove the toluene. The product is purified by distillation to yield about 50 g. of product.

(c) *5-(3-diethylaminopropyl)-7-chloro-2,3,4,5-tetrahydro-1,5-benzothiazepine hydrobromide.*—A solution of 5-(3 - diethylaminopropyl)-7-chloro-2,3,4,5-tetrahydro-1,5-benzothiazepine (31.3 g., 10.1 mole) in 300 ml. of anhydrous ether is cooled to 5° in an ice bath, and dry hydrogen bromide is passed into the cold solution until the pH is 3.5–4. The solid which results is filtered and dried to yield about 37 g. of product. The product is recrystallized from about a liter of ethyl acetate.

In a similar manner, by substituting the zinc salt of 5-methoxy-2-aminothiophenol, 4-methyl-2-aminothiophenol, or 4-tertiary butyl-2-aminothiophenol (the latter being obtainable from 2-nitro-4-tertiary butyl aniline by diazotization, replacement of the diazonium group by a thiol group and reduction of the nitro group to amino) for the zinc salt of 4-chloro-2-aminothiophenol in the procedure of section *a* of Example 4, there is obtained respectively the hydrobromide salt of 5-(3-diethylaminopropyl)-8-methoxy - 2,3,4,5-tetrahydro-1,5-benzothiazepine, 5-(3-diethylaminopropyl) - 7 - methyl-2,3,4,5-tetrahydro-1,5-benzothiazepine and 5-(3-diethylaminopropyl)-7-tertiary butyl-2,3,4,5-tetrahydro-1,5-benzothiazepine.

EXAMPLE 5

5-(3-Morpholinopropyl)-7-Trifluoromethyl-2,3,4,5-Tetrahydro-1,5-Benzothiazepine Hydrochloride (a) *7 - trifluoromethyl - 2,3,4,5 - tetrahydro - 1,5-benzothiazepine.*—A mixture of trimethylene dibromide (422 g., 1.2 mole), glacial acetic acid (350 ml.) and the zinc salt of 4-trifluoromethyl-2-aminothiophenol (225 g., 0.5 mole) is refluxed with stirring for one hour and allowed to cool to room temperature overnight. The mixture is filtered and the precipitate dried to yield about 155 g. of product. The product is recrystallized from absolute alcohol to yield the pure zinc bromide salt of 7 - trifluoromethyl - 2,3,4,5 - tetrahydro - 1,5 - benzothiazepine, which is then added to distilled water and neutralized with sodium bicarbonate. The solution is made strongly alkaline by the addition of sodium hydroxide and extracted with three 300-ml. portions of ether. The ether extracts are combined and dried over anhydrous magnesium sulfate overnight. The ether is removed by distillation to leave 7-trifluoromethyl-2,3,4,5-tetrahydro-1,5-benzothiazepine.

(b) *5 - (3 - morpholinopropyl - 7 - trifluoromethyl-2,3,4,5 - tetrahydro - 1,5 - benzothiazepine.*—A solution of 7 - trifluoromethyl - 2,3,4,5 - tetrahydro - 1,5 - benzothiazepine (46.6 g., 0.2 mole) in 250 ml. of toluene is added dropwise with stirring to a mixture of 10 g. (0.25 mole) of sodium amide and 300 ml. of toluene. The solution is refluxed for five hours. To this solution is added dropwise with stirring 255 ml. of a 0.9 N solution of 3-morpholinopropyl chloride in toluene. After the addition is complete, the solution is refluxed for six hours. The solution is filtered, decolorized with Darco charcoal, filtered with the aid of Hyflo and distilled to remove the toluene. The product is purified by distillation to yield about 41.5 g. of product.

(c) *5 - (3 - morpholinopropyl) - 7 - trifluoromethyl 2,3,4,5 - tetrahydro - 1,5 - benzothiazepine hydrochloride.*—To a solution of 5-(3-morpholinopropyl)-7-trifluoromethyl-2,3,4,5-tetrahydro-1,5-benzothiazepine (36 g., 0.1 mole) in 300 ml. of anhydrous ether is added 44 ml. of 2.3 N ethereal hydrogen chloride solution. The solid which results is filtered and dried to yield about 33 g. of product.

EXAMPLE 6

*4-(2-Dimethylamino-1-Methylethyl)-3,4-Dihydro-2H-1,4-Benzothiazine Hydrochloride*

(a) *4 - (2 - dimethylamino-1-methylethyl) - 3,4 - dihydro-2H-1,4-benzothiazine.*—A solution of 3,4-dihydro-2H-1,4-benzothiazine (27.1 g., 0.179 mole) in 200 ml. of toluene is added dropwise with stirring to 7.8 g. (0.20 mole) of sodium amide in 200 ml. of toluene. After the addition is completed (30 min.), the solution is refluxed for five hours.

To this solution is added dropwise with stirring 220 ml. of a 0.921 M solution of 2-dimethylamino-1-methylethyl chloride in toluene. After the addition is completed (20 min.), the solution is refluxed for six and a half hours.

The solution is filtered through a large Buchner funnel, partially decolorized with Darco charcoal, filtered again, and distilled to remove the toluene. The product is purified by distillation under reduced pressure to yield about 19.6 g. of a liquid distilling at about 111–122° C. at 0.20–0.25 mm.

(b) *4 - (2 - dimethylamino - 1 - methylethyl) - 3,4-dihydro-2H-1,4-benzothiazine hydrochloride.*—To a solution of 4-(2-dimethylamino-1-methylethyl)-3,4-dihydro-2H-1,4-benzothiazine (19.5 g., 0.0826 mole) in 100 ml. of anhydrous ether is added 16.0 ml. of 5.17 N ethanolic hydrogen chloride. The resultant solid (about 20.1 g.), after recrystallization from acetone and from acetonitrile, melts at about 195–197°.

The compound has the formula

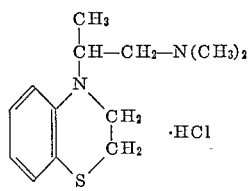

EXAMPLE 7

*4 - (3 - Dimethylaminopropyl) - 3,4 - Dihydro - 2H-1,4-Benzothiazine Hydrochloride*

(a) *4 - (3 - dimethylaminopropyl) - 3,4 - dihydro-2H-1,4-benzothiazine.*—A solution of 3,4-dihydro-2H-1,4-benzothiazine (31.3 g., 0.207 mole) in 200 ml. of toluene is added dropwise to a mixture of 9.4 g. (0.24 mole) of sodium amide in 300 ml. of toluene. After the addition is complete (30 minutes), the solution is refluxed for five hours.

To this solution is added dropwise with stirring 265 ml. of a 0.833 M solution of 3-dimethylaminopropyl chloride in toluene. After the addition is complete (25 minutes), the solution is refluxed for six hours, filtered to remove a gelatinous precipitate, partially decolorized with Darco charcoal, filtered with the aid of Hyflo and distilled to remove the toluene. The product is purified by distillation under reduced pressure to yield about 20.1 g. of product distilling at about 117–128°/0.18–0.14 mm. Upon redistillation, the product boils at about 122.5–124°/0.13–0.15 mm.

(b) *4 - (3 - dimethylaminopropyl) - 3,4 - dihydro - 2H-1,4-benzothiazine hydrochloride.*—To a solution of 14.4 g. (0.0610 mole) of 4-(3-dimethylaminopropyl)-3,4-dihydro-2H-1,4-benzothiazine in 100 ml. of anhydrous ether is added 11.8 ml. of 5.17 N ethanolic hydrogen chloride. The product is filtered and dried to yield about 14.3 g. of product, melting at about 157–158°, after recrystallization from a mixture of acetonitrile and acetone.

EXAMPLE 8

*4-(3-Dimethylaminopropyl)-6-Chloro-3,4-Dihydro-2H-1,4-Benzothiazine Hydrochloride*

(a) *6 - chloro - 3,4 - dihydro - 2H - 1,4 - benzothiazine.*—One liter of 10% ammonium carbonate is added dropwise with stirring to 206 g. (1.05 mole) of 4-chloro-2-aminothiophenol hydrochloride under nitrogen. The mixture is stirred for one hour and filtered under nitrogen. Since it has been reported [Lankelmas, J.A.C.S., 53, 309 (1931)] that the product is rapidly oxidized in air to the corresponding disulfide, contact of the product with air is kept to a minimum. The 4-chloro-2-aminothiophenol is dried in a desiccator overnight.

A mixture of the 4-chloro-2-aminothiophenol, 1,2-dibromoethane (270 g., 1.45 mole) and 250 ml. of glacial acetic acid is refluxed with stirring for six hours and allowed to cool overnight. The solution is added to 2 liters of distilled water and neutralized with sodium bicarbonate. The mixture is extracted with three 1-liter portions of ether. The ether extracts are combined, partially decolorized with Darco charcoal and dried over anhydrous magnesium sulfate overnight.

The magnesium sulfate is removed by filtration and the ether by distillation. The product is purified by distillation under reduced pressure to yield about 46.0 g., B.P. about 91–99°/0.45 mm. (24.6% yield).

(b) *4 - (3 - dimethylaminopropyl) - 6 - chloro - 3,4-dihydro - 2H - 1,4 - benzothiazine hydrochloride.*—By following the procedures of sections *a* and *b* of Example 7, but substituting 6-chloro-3,4-dihydro-2H-1,4-benzothiazine for the 3,4-dihydro-2H-1,4-benzothiazine of the example, there is obtained 4-(3-dimethylaminopropyl)-6-chloro-3,4-dihydro-2H-1,4-benzothiazine hydrochloride.

EXAMPLE 9

*3,4-Dihydro-4-(3-Dimethylaminopropyl)-2-Phenyl-2H-1,4-Benzothiazine Hydrochloride*

(a) *3,4-dihydro-2-phenyl-2H-1,4-benzothiazine.*—5.0 g. (0.12 mole) of lithium aluminum hydride (95%) is dissolved in two pounds of anhydrous ether, stirred and treated with 21.2 g. (0.088 mole) of finely divided 2-phenyl-2H-1,4-benzothiazin-3(4H)-one. The mixture becomes pale yellow in color, and this color disappears after several hours of stirring. After stirring the mixture for three days at room temperature, it is cooled and treated with 10 ml. of ethyl acetate, followed by the cautious dropwise addition of 10 ml. of water and a solution of 2.5 g. of sodium hydroxide in 25 ml. of water. This mixture is stirred for two hours and filtered. The insoluble inorganic material is washed well with ether and the filtrate dried over magnesium sulfate. After distillation of the major portion of the solvent, the product crystallizes. The residue is cooled and filtered, yield about 15.2 g (76%); M.P. about 133–134°. The melting point is not changed after crystallization from absolute alcohol.

(b) *3,4-dihydro-4-(3-dimethylaminopropyl)-2-phenyl-2H-1,4-benzothiazine.*—3.0 g. (0.77 mole) of sodamide is suspended in 50 ml. of toluene and treated with a slurry of 15.2 g. (0.067 mole) of 3,4-dihydro-2-phenyl-2H-1,4-benzothiazine in 150 ml. of warm toluene. The mixture is stirred at room temperature for thirty minutes and then refluxed for one hour, cooled and treated with 9.7 g. (0.08 mole) of 3-dimethylaminopropyl chloride. The mixture is stirred at room temperature for thirty minutes and then refluxed for two hours. After cooling, the mixture is treated with 50 ml. of water and the layers are separated. The organic phase is washed with 25 ml. of water, dried over magnesium sulfate and concentrated under reduced pressure. The residue is fractionated to give about 16.3 g. (78%) of a yellow liquid; B.P. about 195–205° (0.5 mm.). After standing overnight, the distillate partly crystallizes.

(c) *3,4-dihydro-4-(3-dimethylaminopropyl)-2-phenyl-2H-1,4-benzothiazine hydrochloride.*—A solution of the base obtained in section b (14.5 g.) in 30 ml. of absolute alcohol is treated with one equivalent of alcoholic hydrogen chloride. The resulting solution is diluted to 300 ml. with ether and the product filtered and dried; yield about 15.0 g. (93%), M.P. about 140–147°. After subsequent recrystallizations from 150 ml. of isopropyl alcohol and then 20 ml. of absolute alcohol, the material weighs about 11.4 g.; M.P. about 158–163°. It requires three additional crystallizations from 35-ml. portions of absolute alcohol to yield a constant melting product; yield about 8.0 g. (49%); M.P. about 171–172°.

EXAMPLE 10

*3,4-Dihydro-4-(3-Dimethylaminopropyl)-2-Ethyl-2H-1,4-Benzothiazine Hydrochloride*

(a) *2-ethyl-3,4-dihydro-2H-1,4-benzothiazine.*—19.0 g. (0.5 mode) of lithium aluminum hydride is suspended in four pounds of anhydrous ether, stirred for one hour and treated portionwise with 96.5 g. (0.5 mole) of pulverized 2-ethyl-2H-1,4-benzothiazin-3(4H)-one. After completion of the addition, the reaction becomes exothermic, and cooling is necessary. The mixture is stirred at room temperature for twenty hours, cooled and treated dropwise (cautiously) with 20 ml. of ethyl acetate, 40 ml. of water and finally with a solution of 8 g. of sodium hydroxide in 100 ml. of water. The mixture is stirred for two hours at room temperature and the ethereal solution decanted from the inorganic salts and dried over magnesium sulfate. After filtration, the filtrate is concentrated and the residue fractionated to give about 79.5 g. (89%) of a yellow liquid; B.P. about 125° (0.4 mm.).

(b) *3,4-dihydro-4-(3-dimethylaminopropyl) - 2 - ethyl-2H-1,4-benzothiazine.*—41.2 g. (0.23 mole) of 3,4-dihydro-2-ethyl-2H-1,4-benzothiazine is dissolved in 100 ml. of toluene, stirred and added to a suspension of 9.3 g. (0.24 mole) of sodamide in 300 ml. of toluene. The mixture is stirred at room temperature for thirty minutes and then stirred and refluxed for one hour. The sodium salt separates as a yellow solid and is cooled in an ice-bath. 30.4 g. (0.25 mole) of 3-dimethylaminopropyl chloride in 100 ml. of toluene is added in one portion. The mixture is stirred for thirty minutes at room temperature and then refluxed for two hours. After cooling, the mixture is treated with 50 ml. of water and the aqueous phase discarded. The product is separated from the starting material by extraction with dilute hydrochloric acid. The organic phase is extracted with a solution of 25 ml. of concentrated hydrochloric acid in 150 ml. of water; the layers are separated and the organic phase washed with 25 ml. of water. The aqueous phases are combined, extracted with 100 ml. of ether and then basified with a solution of 16 g. of sodium hydroxide in 50 ml. of water. The free base is extracted with ether and dried over magesium sulfate. The mixture is filtered and the filtrate concentrated. The residue distills as a pale yellow liquid weighing about 33.2 g. (55%); B.P. about 141–143° (0.3 mm.).

(c) *3,4-dihydro-4-(3-dimethylaminopropyl) - 2 - ethyl-2H-1,4-benzothiazine hydrochloride.*—A solution of 27.8 g. of the base obtained in section b is dissolved in 100 ml. of absolute alcohol and treated with one equivalent of hydrogen chloride in 22 ml. of absolute alcohol. The product begins to crystallize from solution. After dilution with 200 ml. of ether, the mixture is cooled and filtered; yield about 30.7 g. (97%); M.P. about 195–196°. This material is crystallized from 120 ml. of absolute alcohol to give about 28.0 g. (88%) of colorless product; M.P. about 198–199°.

EXAMPLE 11

*3-Diethylaminoethyl-6-Methoxybenzothiazoline Oxalate*

(a) *6-methoxybenzothiazoline.*—A mixture of 155 g. (1 mole) of 2-amino-5-methoxy-benzenethiol, 293 g. (1.1 mole) of diiodomethane and 300 ml. of glacial acetic acid is refluxed with stirring for two hours in an atmosphere of nitrogen. This and all subsequent manipulations are carried out in an inert atmosphere. The reaction mixture is cooled and the acetic acid removed by distillation under reduced pressure. The residue is suspended in 500 ml. of water and the solution made strongly alkaline with sodium hydroxide solution. The precipitated oil is extracted with three 500-ml. portions of ether, the ether extracts dried and the solvent then is removed by distillation. The residue is fractionally distilled under reduced pressure to give the desired product (37 grams).

(b) *Diethylaminoethyl - 6 - methoxybenzothiazoline.*—A solution of 6-methoxybenzothiazoline (33.5 g., 0.2 mole) in 300 ml. of toluene is added dropwise with stirring to a mixture of 10 g. (0.25 mole) of sodium amide in 300 ml. of toluene. To the solution after five hours stirring there is added dropwise a solution of 29.8 grams (0.22 mole) of freshly distilled diethylaminoethyl chloride in 200 ml. of toluene. After the addition is complete, the solution is refluxed for six hours. The solution is filtered, decolorized with Darco charcoal, filtered with the aid of Hyflo and then distilled to remove the toluene. The product is purified by distillation to yield about 31 grams of product.

(c) *3-diethylaminoethyl-6-methoxybenzothiazoline Oxalate.*—To a solution of 3-diethylaminoethyl-6-methoxy-benzothiazoline (13.3 g., 0.05 mole) in 100 ml. of ether is added a solution of 4.6 grams of anhydrous oxalic acid in 30 ml. of anhydrous acetonitrile. The salt, precipitated completely by the addition of anhydrous ether, is filtered and desiccator-dried to yield about 15.5 grams of product.

The invention may be otherwise variously embodied within the scope of the appended claims.

We claim:
1. A compound selected from the group consisting of bases of the formula

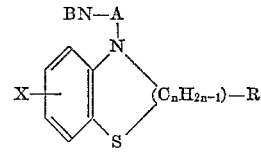

and non-toxic acid addition salts thereof, wherein n is a positive integer less than four; X is selected from the group consisting of hydrogen, lower alkyl, lower alkoxy, halo and trifluoromethyl; R is selected from the group consisting of hydrogen, lower alkyl and X-substituted phenyl, wherein X is as above-defined; A is lower alkylene; and BN is selected from the class consisting of amino, (lower alkyl) amino, di(lower alkyl) amino, (hydroxy-lower alkyl) amino, di(hydroxy-lower alkyl), piperidino, morpholino and pyrrolidino.

2. A compound of the formula

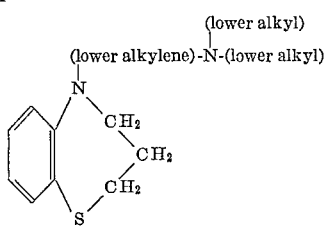

3. A non-toxic acid-addition salt of the compound of claim 2.

4. A non-toxic acid-addition salt of a compound of the formula

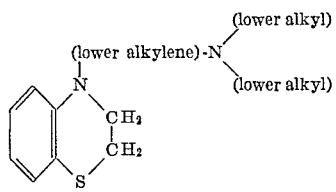

5. A non-toxic acid-addition salt of a compound of the formula

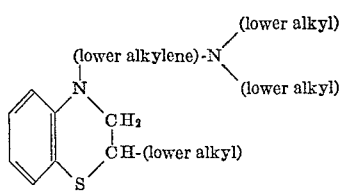

6. A non-toxic acid-addition salt of a compound of the formula

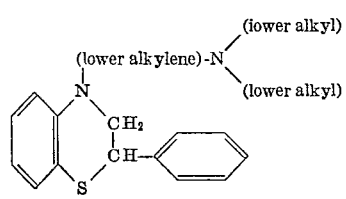

7. A compound of the formula

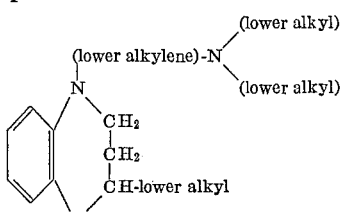

8. A compound of the formula

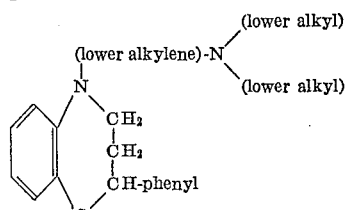

9. 5 - (3 - dimethylaminopropyl) - 2,3,4,5 - tetrahydro-1,5-benzothiazepine.

10. 5 - (3 - dimethylaminopropyl) - 2,3,4,5 - tetrahydro-1,5-benzothiazepine hydrochloride.

11. 5 - (3 - diethylaminopropyl) - 7 - chloro - 2,3,4,5-tetrahydro-1,5-benzothiazepine hydrobromide.

12. 4 - (2 - dimethylaminopropyl) - 3,4 - dihydro - 2H-1,4-benzothiazine hydrochloride.

References Cited in the file of this patent
UNITED STATES PATENTS

| | | |
|---|---|---|
| 2,393,351 | Wilson | Jan. 22, 1946 |
| 2,789,978 | Rath | Apr. 23, 1957 |
| 2,824,102 | Zimmermann | Feb. 18, 1958 |
| 2,852,528 | Hoffmann et al. | Sept. 16, 1958 |

FOREIGN PATENTS

| | | |
|---|---|---|
| 232,076 | Germany | Mar. 6, 1911 |
| 575,114 | Germany | Apr. 24, 1933 |

UNITED STATES PATENT OFFICE
CERTIFICATE OF CORRECTION

Patent No. 3,117,124                            January 7, 1964

John Krapcho et al.

It is hereby certified that error appears in the above numbered patent requiring correction and that the said Letters Patent should read as corrected below.

Column 7, line 39, for "mode" read -- mole --; column 10, lines 2 to 10, the formula should appear as shown below instead of as in the patent:

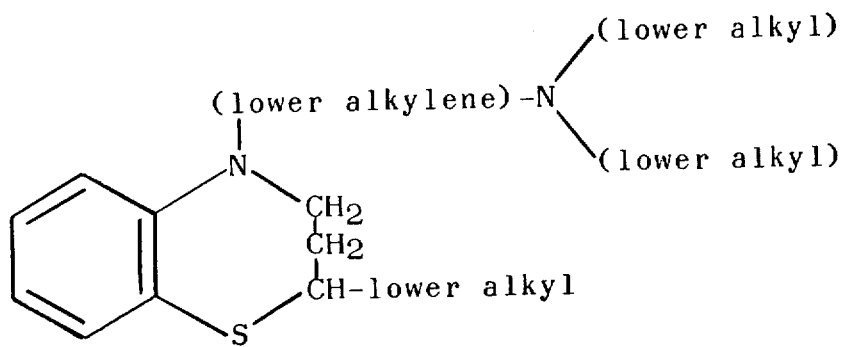

Signed and sealed this 2nd day of June 1964.

(SEAL)
Attest:

ERNEST W. SWIDER                        EDWARD J. BRENNER
Attesting Officer                       Commissioner of Patents